March 29, 1949.  H. W. BROWN  2,465,428
HAND MIRROR HAVING FRAME WITH
OVERLAPPING HANDLE PORTIONS
Filed April 20, 1945  2 Sheets-Sheet 2
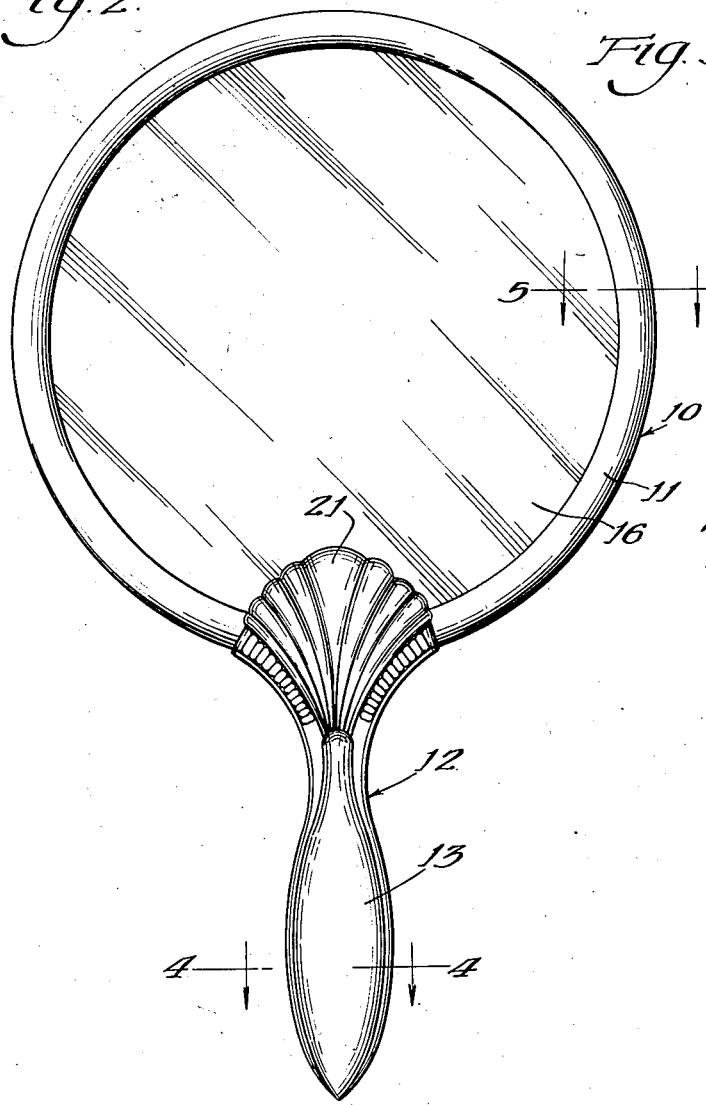
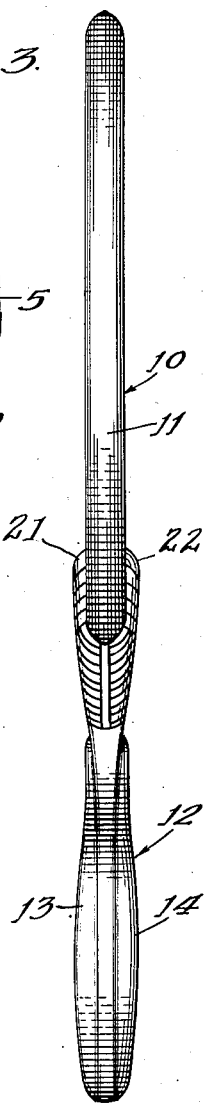
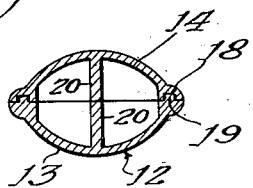
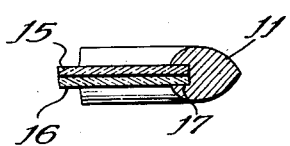
Inventor:
Herbert W. Brown
By: Wallace and Cannon
Attorneys Patented Mar. 29, 1949

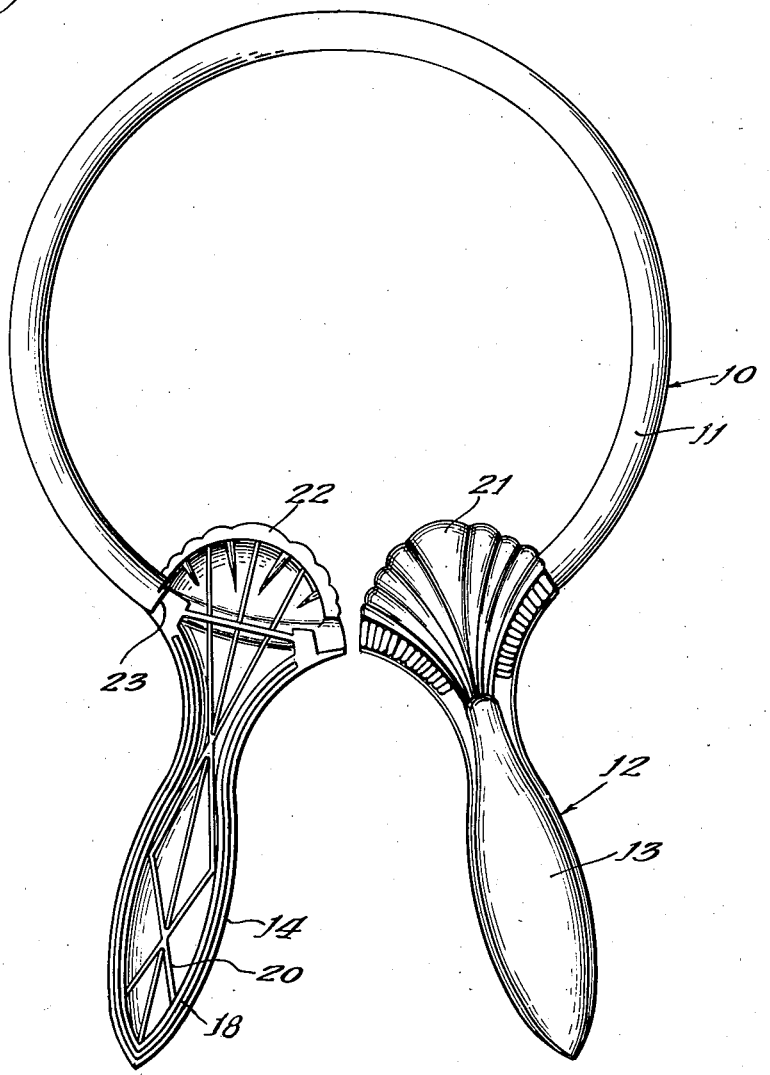

2,465,428

UNITED STATES PATENT OFFICE 2,465,428

HAND MIRROR HAVING FRAME WITH OVERLAPPING HANDLE PORTIONS

Herbert W. Brown, Chicago, Ill.

Application April 20, 1945, Serial No. 589,331

1 Claim. (Cl. 88—102)

This invention relates to a hand mirror.

More particularly, this invention relates to a hand mirror embodying a mirror frame and handle which are molded from plastic material as a single, unitary piece and in which the said unitary mirror frame and handle and the reflecting mirror retained thereby are held in assembled position without the use of any screws or other metallic parts.

An object of the invention is to provide a novel hand mirror embodying a mirror frame and a handle molded or cast of plastic material in a single or unitary structure and in which said unitary mirror frame and handle and the reflecting mirror retained thereby are assembled and held in position of use without the use of any screws or like fastening devices.

An additional object of the invention is to provide a novel one-piece molded plastic mirror frame and handle for a hand mirror.

Other objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

Fig. 1 is a plan view illustrating a preferred embodiment of the new molded plastic one-piece mirror frame and handle as the same appears when removed from the mold;

Fig. 2 is a plan view illustrating a typical embodiment of the new hand mirror in assembled condition;

Fig. 3 is an edge elevational view of the new hand mirror shown in Fig. 2;

Fig. 4 is a transverse sectional view of the handle construction embodied in the new hand mirror, on line 4—4 in Fig. 2; and Fig. 5 is a fragmentary sectional detail view, on line 5—5 in Fig. 2, illustrating the construction of the mirror frame and the arrangement of the marginal edge portion of the reflecting mirror therein.

A typical embodiment of the new hand mirror is shown in completed and assembled condition in Figs. 2 and 3, and is therein generally indicated at 10, and comprises a mirror frame 11 and a handle 12 which are molded as a single or unitary piece from a suitable resinous plastic molding compound. While other suitable resinous plastic materials may be used in the manufacture of the new one-piece mirror frame and handle I have found that a preferred material for this purpose is the cellulose acetate molding compound known by the trade-name "Tenite I" (Tennessee Eastman Corporation). This particular plastic molding compound is admirably suited for use in molding the new one-piece mirror frame and handle since it has all of the necessary properties desired therefor including tensile strength, flexibility, colorability, elasticity, and other properties which will be made apparent hereinafter.

A groove 17 is provided in the mirror frame 11, on the inner surface thereof, and in the assembled condition of the new mirror, as shown in Figs. 2 and 5, the peripheral or marginal edge portion of the reflecting mirror member extends into this groove 17.

In the typical embodiment of the new mirror shown in the drawings the reflecting mirror is composed of two glass plates 15 and 16 adhesively secured together at their inner surfaces and each provided with a reflecting mirror surface on its outer face.

The handle 12 of the new hand mirror 10 is comprised of two complementary handle sections 13 and 14. Each of these two handle sections is provided with a series of reenforcing ribs or walls 20 which enhance the constructural strength of the assembled handle. The handle element 13 includes a mirror clamping jaw portion 21 which projects over a portion of one face of the reflecting mirror member 15—16 and the handle element 14 includes a similar and complementary mirror-clamping jaw portion 22 which projects over a portion of the opposite face of the reflecting mirror member 15—16. Each of the jaws 21 and 22 has a shoulder 23 and these shoulders 23 engage or abut each other when the mirror is assembled.

A groove or mortise 18 is cast in the handle element 14, on the inner surface thereof, and this groove 18 extends around substantially the entire marginal edge of the handle element 14, except for the clamping jaw portion 21 thereof, as shown in Figs. 1 and 4, and a complementary and correspondingly shaped tongue or tenor 19 is cast upon the inner surface of the handle element 13.

The new one-piece mirror frame and handle are cast in and are taken from the mold in the form in which they are shown in Fig. 1 with the two handle elements 13 and 14 spaced or spread apart in the same general plane but tending or being urged by their own resiliency into overlying or overlapping relationship. In order to assemble the one-piece mirror frame and handle 11—12 and the reflecting mirror member 15—16 of the new hand mirror the mirror frame 11 is suitably clamped or manually, or otherwise, held in expanded condition, as in Fig. 1, and the marginal edge portion of the reflecting mirror member 15—16 is inserted into the groove 17 in the mirror frame 11. During this operation the handle sections 13 and 14 may be held apart manually or by means of any suitable clamping device so as to maintain the mirror frame in expanded condition, against the force of its own resiliency which tends to urge it into the shape or form in which it is shown in Fig. 2.

After the mirror member 15—16 has been inserted into the groove 17 in the frame 11 a suitable liquid bonding agent is poured or otherwise inserted into the groove 18 in the handle section 14 by means of an eye-dropper, or otherwise. The handle sections 13 and 14 are then released and are brought into overlying or overlapping relationship with the tongue 19 on the handle section 13 projecting into the groove 18 in the handle section 13 and with the shoulders 23 disposed in abutting relationship.

The thus assembled parts of the new hand mirror may then be placed in a suitable clamp, or otherwise held together, for a sufficient length of time to enable the bonding agent to dry in and around the thus interlocked groove 18 and tongue 19, thereby firmly and permanently securing the parts together. The clamp or other holding device may then be removed, whereupon the new hand mirror is ready for sale and use.

I have found that a preferred bonding agent for use in bonding the two handle sections 13 and 14 together may be made by dissolving approximately one (1) part, by volume, of the same granular cellulose acetate molding compound, as is used in molding the one-piece mirror frame and handle 11—12, in approximately three (3) parts, by volume, of a suitable volatile solvent therefor and for this purpose I have found acetone to be well suited. A bonding solution thus formed is sufficiently fluid so that it may be dropped into the groove 18 by means of an eye-dropper. Moreover, the aforesaid bonding solution has the additional advantage which resides in the fact that it not only forms a good bond, per se, but the acetone solvent component thereof, being a solvent for the cellulose acetate of which the handle sections 13 and 14 are composed, tends to dissolve or soften some of the material in the handle sections 13—14. This causes the handle sections to become firmly cemented together after the volatile acetone solvent component of the bond has evaporated and the bond has dried or set.

By reason of its solvent action upon cellulose acetate I may use acetone, per se, as the bonding agent for securing the two handle sections 13—14 together but I prefer to use the cellulose acetate-acetone bonding agent referred to above.

In place of the cellulose acetate resin ("Tenite I"), referred to above, I may also use other suitable plastic or thermoplastic materials and among these is cellulose acetate butyrate ("Tenite II," Tennessee Eastman Corporation) but the latter material is not as well suited for the purposes of the present invention as the preferred material, referred to above, due, in part, to greater difficulty in bonding the handle sections together if and when the latter material is used.

It will thus be seen that the one-piece mirror frame and handle are composed entirely of plastic material, and that the one-piece mirror frame and handle 11—12 is assembled with the mirror member 15—16 without the use of any metal screws or other metallic parts so that the new hand mirror is free from any parts which would scratch the top of a mirrored dressing table or like surfaces upon which hand mirrors are frequently used.

Moreover, the new one-piece plastic mirror frame and handle 11—12 may be cast or molded in various colors which enhances its salability as compared to hand mirrors embodying metallic frames and handles.

It will thus be seen from the foregoing description, considered in conjunction with the accompanying drawings, that the present invention provides a new and improved hand mirror, and thus accomplishes its intended objects, and has desirable advantages and characteristics, including those hereinbefore pointed out and others which are inherent in the invention.

I claim:

A hand mirror comprised of a one-piece substantially circular open mirror frame having a substantially annular groove formed therein on its inner peripheral surface for the reception of the peripheral edge portion of a substantially annular mirror member arranged therein, the said mirror frame being composed of cellulose acetate and having end portions which are adapted to be spread apart for the reception of the said substantially annular mirror member within the said mirror frame, a substantially annular mirror member arranged within the said mirror frame and having a peripheral edge portion extending into the said substantially annular groove in the said mirror frame, and a handle member composed of cellulose acetate and comprising two complementary handle sections formed integral with the said substantially annular mirror frame, each of the said handle sections being formed as an integral extension of one of the said end portions of the said mirror frame, each of the said handle sections including a hand grip portion, each of the said handle sections also including a mirror-clamping jaw portion projecting inwardly beyond the peripheral edge of the said mirror member over a portion of a face of the said mirror member, the said hand grip portions of the said handle sections having their inner surfaces arranged in overlapping relationship and the said mirror-clamping jaw portions of the said handle sections having their inner surfaces arranged in overlapping relationship on opposite sides of the said substantially annular mirror member, the said overlapping surfaces of the said handle portions being substantially parallel to the plane of the said substantially annular mirror member, the said inner overlapping surface of one of the said hand grip portions having a groove formed therein and the said inner overlapping surface of the other one of the said hand grip portions having a tongue formed therein extending into the said groove in the said hand grip portion of the other one of the said handle sections, and means for retaining the said inner overlapping surfaces of the said hand grip portions of the said handle sections together in overlapping relationship and against separation relative to each other comprising an adhesive bonding material comprised of cellulose acetate arranged in the said groove in the said one of the said hand grip portions and retaining the said tongue therein.

HERBERT W. BROWN.

REFERENCES CITED

The following references are of record in the file of this patent:

UNITED STATES PATENTS

| Number | Name | Date |
| --- | --- | --- |
| 292,073 | Tice | Jan. 15, 1884 |
| 345,982 | Miller | July 20, 1886 |
| 351,958 | Booth | Nov. 2, 1886 |
| 1,339,673 | Schneider | May 11, 1920 |
| 1,521,875 | Farrell | Jan. 6, 1925 |
| 1,547,142 | Bausch | July 21, 1925 |
| 1,565,354 | Furrell | Dec. 15, 1925 |
| 2,120,834 | Donaldson | June 14, 1938 |
| 2,139,565 | Steinen | Dec. 6, 1938 |